US008892855B2

(12) United States Patent
Leclercq (10) Patent No.: US 8,892,855 B2
(45) Date of Patent: Nov. 18, 2014

(54) ENCRYPTION KEYS DISTRIBUTION FOR CONDITIONAL ACCESS SOFTWARE IN TV RECEIVER SOC

(75) Inventor: Maxime Leclercq, Encinitas, CA (US)

(73) Assignee: MaxLinear, Inc., Carlsbad, CA (US)

( * ) Notice: Subject to any disclaimer, the term of this patent is extended or adjusted under 35 U.S.C. 154(b) by 585 days.

(21) Appl. No.: 13/205,578

(22) Filed: Aug. 8, 2011

(65) Prior Publication Data

US 2012/0198224 A1    Aug. 2, 2012

Related U.S. Application Data (60) Provisional application No. 61/372,390, filed on Aug. 10, 2010.

(51) Int. Cl.
| | | |
|---|---|---|
| G06F 15/177 | (2006.01) | |
| G06F 21/00 | (2013.01) | |
| H04L 9/08 | (2006.01) | |
| H04L 9/14 | (2006.01) | |

(52) U.S. Cl.
CPC ............ *H04L 9/0877* (2013.01); *H04L 9/0819* (2013.01); *H04L 9/088* (2013.01); *H04L 9/14* (2013.01); *H01L 9/083* (2013.01)
USPC ................... 713/1; 713/2; 713/100; 713/182; 726/26

(58) Field of Classification Search
CPC ............ H04L 9/00; H04L 9/085; H04L 9/14; H04L 9/0816; H04L 9/0819; H04L 9/088; H04L 9/083; H04L 9/0877; H04N 7/167; G06F 21/602; G06F 21/62; G06F 21/10; G06F 21/575
See application file for complete search history.

(56) References Cited

U.S. PATENT DOCUMENTS

| | | |
|---|---|---|
| 6,424,717 B1 | 7/2002 | Pinder et al. |
| 6,882,729 B2 | 4/2005 | Arling et al. |
| 7,409,570 B2 | 8/2008 | Suzuoki |
| 7,506,358 B1 | 3/2009 | Fry et al. |
| 8,180,735 B2 | 5/2012 | Ansari et al. |
| 2003/0079138 A1 | 4/2003 | Nguyen et al. |

(Continued)

OTHER PUBLICATIONS

International Search Report and Written Opinion corresponding to the PCT Application No. PCT/US2011/023749, date of mailing Apr. 6, 2011, 18 pages.

(Continued)

*Primary Examiner* — Dennis M Butler
(74) *Attorney, Agent, or Firm* — Ardeshir Tabibi, Esq.; Kilpatrick, Townsend & Stockton LLP (57) ABSTRACT

A method for securely generating and distributing encryption keys includes generating, by a secured server, a pair of keys including a first key and a second key and providing, by a key distributing unit, the first key to a first recipient and a second key to a second recipient. The first recipient may use the first key to encrypt a data file and send the encrypted data file via a non-volatile memory device to a target subscriber. The second recipient may program the second key into an one-time-programmable register contained in a secure element during a manufacturing process. The secure element may further include a random access memory configured to store an image of the encrypted data file, a read-only memory containing a boot code, and a processing unit coupled to the random-access memory and the read-only memory and operative to decrypt the encrypted data file.

18 Claims, 8 Drawing Sheets

(56) References Cited

U.S. PATENT DOCUMENTS

| | | |
|---|---|---|
| 2003/0163713 A1 | 8/2003 | Cocchi et al. |
| 2004/0025010 A1 | 2/2004 | Azema et al. |
| 2004/0039911 A1 | 2/2004 | Oka et al. |
| 2004/0044906 A1 | 3/2004 | England et al. |
| 2004/0181303 A1 | 9/2004 | Walmsley |
| 2004/0210796 A1 | 10/2004 | Largman et al. |
| 2005/0005138 A1 | 1/2005 | Awai |
| 2005/0138397 A1 | 6/2005 | Kusudo et al. |
| 2006/0015731 A1 | 1/2006 | Lakshmi Narayanan |
| 2006/0117177 A1 | 6/2006 | Buer |
| 2006/0236113 A1 | 10/2006 | Uzawa |
| 2006/0259743 A1 | 11/2006 | Suzuoki |
| 2006/0272022 A1 | 11/2006 | Loukianov et al. |
| 2007/0074045 A1 | 3/2007 | Van Essen et al. |
| 2007/0150734 A1 | 6/2007 | Gervais et al. |
| 2007/0180464 A1 | 8/2007 | Dellow et al. |
| 2007/0192610 A1 | 8/2007 | Chun et al. |
| 2007/0294494 A1 | 12/2007 | Conti et al. |
| 2008/0005586 A1 | 1/2008 | Munguia |
| 2008/0016349 A1 | 1/2008 | Kahn |
| 2008/0101604 A1 | 5/2008 | Kocher et al. |
| 2008/0183992 A1* | 7/2008 | Martin et al. ............ 711/162 |
| 2008/0219494 A1 | 9/2008 | Chen |
| 2008/0235406 A1 | 9/2008 | Meijer et al. |
| 2008/0240230 A1 | 10/2008 | Oxman et al. |
| 2008/0267410 A1 | 10/2008 | Dellow |
| 2009/0044233 A1 | 2/2009 | Brandt et al. |
| 2009/0049220 A1 | 2/2009 | Conti et al. |
| 2009/0094597 A1 | 4/2009 | Moskalik et al. |
| 2009/0109487 A1 | 4/2009 | Tsukada |
| 2009/0144557 A1 | 6/2009 | Sutton |
| 2010/0014671 A1* | 1/2010 | Moroney ............ 380/262 |
| 2010/0020963 A1 | 1/2010 | Candelore |
| 2010/0293614 A1 | 11/2010 | Vilppola et al. |
| 2011/0138192 A1* | 6/2011 | Kocher et al. ............ 713/189 |
| 2012/0036372 A1 | 2/2012 | Leclercq |
| 2012/0042157 A1 | 2/2012 | Leclercq |
| 2012/0060039 A1 | 3/2012 | Leclercq |
| 2012/0079261 A1 | 3/2012 | Leclercq |
| 2012/0079279 A1 | 3/2012 | Leclercq |
| 2012/0079287 A1 | 3/2012 | Leclercq |

OTHER PUBLICATIONS

International Search Report and Written Opinion corresponding to the PCT Application No. PCT/US2011/024543, date of mailing Apr. 6, 2011, 17 pages.

International Search Report and Written Opinion corresponding to the PCT Application No. PCT/US2011/030581, date of mailing May 25, 2011, 8 pages.

International Search Report and Written Opinion corresponding to the PCT Application No. PCT/US2011/030378, date of mailing May 31, 2011, 13 pages.

International Search Report and Written Opinion corresponding to the PCT Application No. PCT/US2011/030033, dated of mailing Nov. 8, 2011, 14 pages.

International Search Report and Written Opinion corresponding to the PCT Application No. PCT/US2011/027299, dated of mailing Oct. 27, 2011, 14 pages.

Non-Final Office Action for U.S. Appl. No. 13/072,069, mailed on Nov. 28, 2012, 22 pages.

Non-Final Office Action for U.S. Appl. No. 13/026,000, mailed on Dec. 26, 2012, 26 pages.

International Preliminary Report on Patentability for PCT Application No. PCT/US2011/030033, mailed on Oct. 11, 2012, 8 pages.

International Preliminary Report on Patentability for PCT Application No. PCT/US2011/030378, mailed on Oct. 11, 2012, 7 pages.

International Preliminary Report on Patentability for PCT Application No. PCT/US2011/030581, mailed on Oct. 11, 2012, 6 pages.

International Preliminary Report on Patentability for PCT Application No. PCT/US2011/027299, mailed on Sep. 20, 2012, 7 pages.

Non-Final Office Action for U.S. Appl. No. 13/021,178, mailed on Sep. 17, 2012, 28 pages.

Leach et al. "A Universally Unique Identifier (UUID) URN Namespace", downloaded from http://www.ietf.org/rfe/rfe4122.txt, on Sep. 8, 2012, 30 pages.

Brusilovsky et al. "Password-Authenticated Diffie-Hellman Exchange (PAK)", downloaded from http://tools.ietf.org/html/draft-brusilovsky-pak-09, on Sep. 8, 2012, 13 pages.

Non-Final Office Action for U.S. Appl. No. 13/041,256, mailed on Sep. 14, 2012, 33 pages.

International Preliminary Report on Patentability for PCT Application No. PCT/US2011/024543, mailed on Aug. 23, 2012, 8 pages.

International Preliminary Report on Patentability for PCT Application No. PCT/US2011/023749, mailed on Aug. 16, 2012, 9 pages.

Final Office Action for U.S. Appl. No. 13/021,178, mailed on May 23, 2013, 20 pages.

Final Office Action for U.S. Appl. No. 13/041,256, mailed on May 24, 2013, 37 pages.

Final Office Action for U.S. Appl. No. 13/072,069, mailed on Jul. 23, 2013, 20 pages.

Non-Final Office Action for U.S. Appl. No. 13/026,000, mailed on Jul. 30, 2013, 24 pages.

Non-Final Office Action for U.S. Appl. No. 13/076,172, mailed on Nov. 7, 2013, 20 pages.

Non-Final Office Action for U.S. Appl. No. 13/075,038, mailed on Feb. 3, 2014, 23 pages.

Final Office Action for U.S. Appl. No. 13/026,000, mailed on Mar. 14, 2014, 22 pages.

Non-Final Office Action for U.S. Appl. No. 13/041,256, mailed on May 7, 2014, 29 pages.

Notice of Allowance for U.S. Appl. No. 13/076,172, mailed on May 29, 2014, 7 pages.

* cited by examiner

ENCRYPTION KEYS DISTRIBUTION FOR CONDITIONAL ACCESS SOFTWARE IN TV RECEIVER SOC

CROSS-REFERENCES TO RELATED APPLICATIONS

The present application claims benefit under 35 USC 119 (e) of U.S. provisional application No. 61/372,390, filed Aug. 10, 2010, entitled "Control Word Obfuscation in Secure TV Receiver", the content of which is incorporated herein by reference in its entirety:

The present application is related to and incorporates by reference the entire contents of the following US applications:

U.S. application Ser. No. 13/021,178, filed Feb. 4, 2011, entitled "Conditional Access Integration in a SOC for Mobile TV Applications";

U.S. application Ser. No. 13/026,000, filed Feb. 11, 2011, entitled "RAM Based Security Element for Embedded Applications";

U.S. application Ser. No. 13/041,256, filed Mar. 4, 2011, entitled "Code Download and Firewall for Embedded Secure Application";

U.S. application Ser. No. 13/072,069, filed Mar. 25, 2011, entitled "Firmware Authentication and Deciphering for Secure TV Receiver";

U.S. application Ser. No. 13/075,038, filed Mar. 29, 2011, entitled "Generation of SW Encryption Key During Silicon Manufacturing Process"; and U.S. application Ser. No. 13/076,172, filed Mar. 30, 2010, entitled "Control Word Obfuscation in Secure TV Receiver".

BACKGROUND OF THE INVENTION

Embodiments of the present invention relate to the field of encryption key distribution. More particularly, embodiments of the present invention relate to a system, apparatus and method for securely distributing encryption keys for conditional access software in TV receiver systems.

Various contents such as movies, music, game software, sport events, and others are offered by service providers through a variety of wired and wireless communication networks. Some of these contents are encrypted so that they can be accessed or viewed by subscribers who are in possession of a corresponding decryption key. It is understandable that service providers will try to generate encryption keys and distribute the keys in a secure manner. An encryption technique is the use of asymmetric key algorithms, where the key used to encrypt a widely distributed software component (e.g., firmware) is not the same as the key used to decrypt it. Embodiments of the present invention relate to an encryption key distribution and may apply to conditional access systems for digital broadcast television.

There are several well-known digital radio and digital TV broadcast standards. In Europe, the digital radio broadcast is the DAB (Digital Audio Broadcasting) adopted by the ITU-R standardization body and by ETSI. The digital TV standard is DVB (Digital Video Broadcasting) in Europe, ATSC (Advanced Television Systems Committee) in the U.S., and ISDB (Integrated Services Digital Broadcasting) in Japan and South America. In addition to these standards, there are also mobile TV standards which relate to the reception of TV on handheld devices such as mobile phones or the like. Some well-known mobile TV standards are DVB-H (Digital Video Broadcasting-Handheld), CMMB (China Multimedia Mobile Broadcasting), and DMB (Digital Multimedia Broadcasting).

In most digital TV broadcasting services, the service providers scramble and encrypt the transmitted data streams to protect the broadcasted content and require their customers or users to install "security protection" mechanisms to decrypt and descramble the content. Security protection mechanisms such as digital rights management enable users to store content. Conditional access (CA) systems are other security protection mechanisms that allow users to access and view content but may or may not record the viewed content.

In a typical pay-TV system, the conditional access software runs on a dedicated secure element implementing robust mechanisms so as to prevent a malicious entity ("hacker") from gaining access to the broadcast system secret to decipher the TV content. The CA instruction code and keys provisioned by the CA provider adapted to ensure security are typically stored in the discrete secure element. The communication link between the discrete secure element and the demodulator, if not protected, presents a vulnerable entry point for hackers to get access to the software or introduces malicious code to the TV system.

Figure 1:
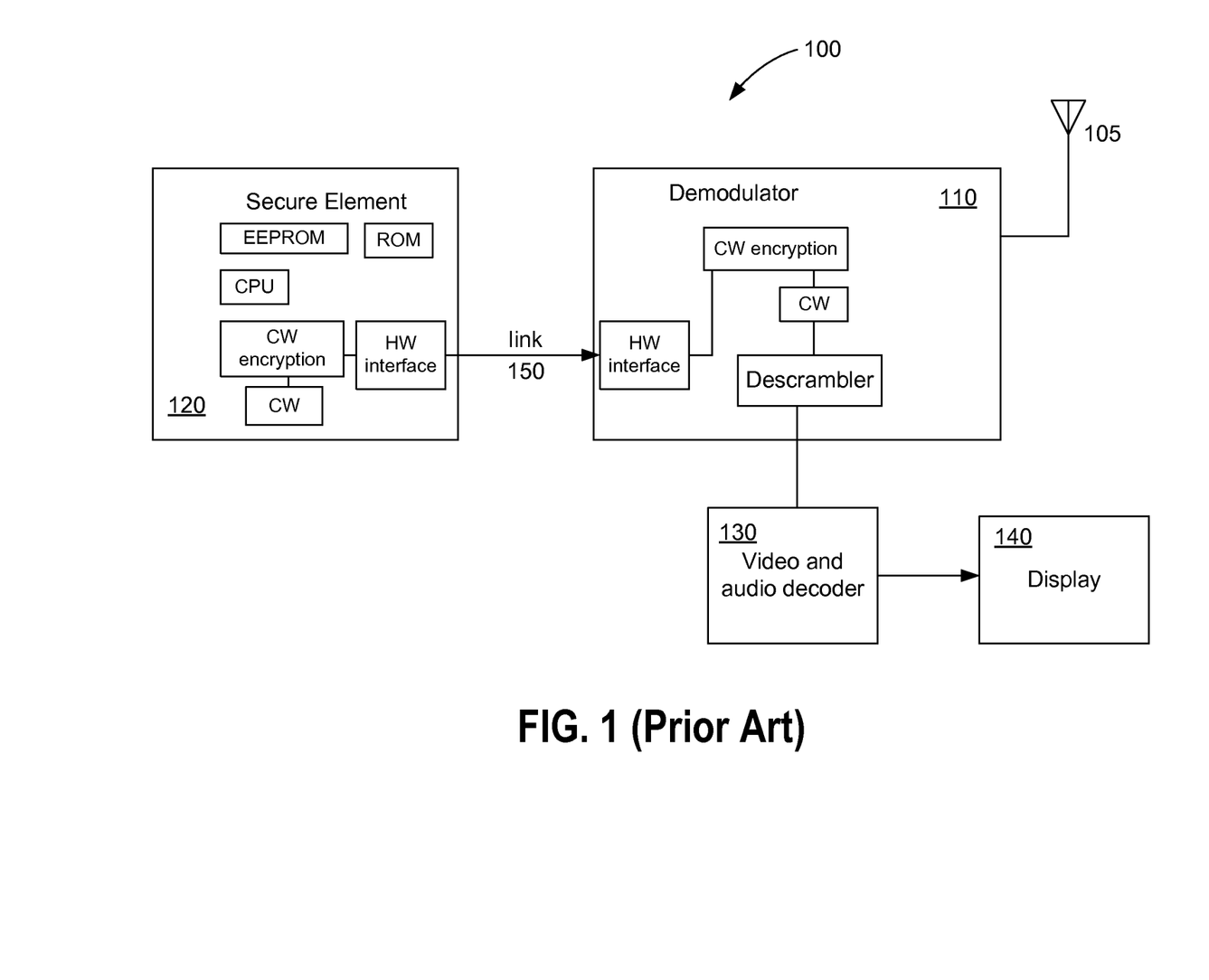
FIG. 1 is a block diagram of a conventional TV receiver 100 performing conditional access (CA) functions.

FIG. 1 is a block diagram of a conventional TV receiver 100 performing conditional access (CA) functions. Receiver 100 includes a TV demodulator 110 coupled to a suitable antenna 105 for receiving broadcast content. The broadcast content may be encrypted by a control word (CW). Demodulator 110 is connected to a dedicated secure element 120 via a communication link 150. Communication link 150 can be a proprietary interface or a standard interface. Secure element 120 may be provided by the service provider and controls access to a broadcast service by providing one or more control words to the demodulator via the communication link. Secure element 120 may include a CPU coupled to a memory unit which may contain EEPROM and/or ROM. Secure element 120 may also hold service entitlement information controlled by the service provider. The service provider may communicate with the secure element using encrypted messages that carry descrambling keys and other service management information.

Demodulator 110 receives the code word from the secure element and uses the code word to descramble the encrypted content. The clear stream is then provided to a video and audio decoder 130. A display 140 coupled to the video and audio decoder displays the decoded video and audio data streams. In general, secure element 120 may be provided in several forms and in multiple packaging options. For example, the secure element may be a dedicated surface mount device mounted on the receiver, a SIM card (e.g., in the context of a mobile phone), a secure SD card, or a module.

Because the communication link between the secure element and the demodulator is not secure, an additional layer, typically a software layer, is used to encrypt messages between the secure element and the demodulator. However, hackers or attackers may get access to this software layer through the communication link, and with it gain access to the code word. Therefore, the software layer must be made protected.

It can be seen that the conventional secure element has a hardware structure that does not provide flexibility because it requires a dedicated module and a hardware connection to the demodulator. Furthermore, conventional techniques do not appear to address the concerns of service providers, CA operators, and content owners, namely, to provide security to the operation of their devices and the protection of their broadcast contents.

There is therefore a need to provide systems and methods to securely distribute the encryption keys to device manufacturers and firmware providers when a service provider does not have direct control to the device manufacturing process and firmware provision but still prevent unauthorized users to gain access to the broadcast services and contents.

BRIEF SUMMARY OF THE INVENTION

Embodiments of the present invention provide a system and method of generating and distributing encryption keys to authorized recipients. The system includes a secured server that generates a unique pair of keys including a first key and a second key and a key distribution unit connected to the secured server for transmitting the first key to a first recipient and a second key to a second recipient. The first recipient may use the first key to encipher (encrypt) a data file and send the encrypted data file via a non-volatile memory device to a target subscriber. The second recipient may program the second key into an one-time-programmable register contained in a secure element during a manufacturing process. The secure element may further include a random access memory configured to store an image (copy) of the encrypted data file, a read-only memory containing a boot code, and a processing unit coupled to the random-access memory and the read-only memory and operative to decipher (decrypt) the encrypted data file. In an embodiment, the first recipient may be a conditional access firmware provider, and the second recipient may be an original design manufacturer, an original equipment manufacturer, or a device manufacturer that makes the secure element and sent it to the target subscriber. In an embodiment, the secured server may be operated by a service or content provider.

Embodiments of the present invention also disclose a method for securely generating and distributing encryption keys. The method includes generating, by a secured server, a pair of keys including a first key and a second key and providing, by a key distributing unit, the first key to a first recipient and a second key to a second recipient. The first recipient may use the first key to encrypt a data file and send the encrypted data file via a non-volatile memory device to a target subscriber. The second recipient may program the second key into an one-time-programmable register contained in a secure element during a manufacturing process. The secure element may further include a random access memory configured to store an image of the encrypted data file, a read-only memory containing a boot code, and a processing unit coupled to the random-access memory and the read-only memory and operative to decrypt the encrypted data file by executing the boot code.

BRIEF DESCRIPTION OF THE DRAWINGS

Preferred embodiments of the present invention are described below, by way of example only, with reference to the accompanying drawings, in which.

DETAILED DESCRIPTION OF THE INVENTION

Conditional access is used by TV broadcasters to generate revenue. To achieve this, security guidelines are used to protect the keys provisioned to the user and to guarantee that no hacker or malicious entity can crack the system and watch contents for free. These guidelines, also referred to as security requirements, define methods adapted to prevent misuse of the SOC (system-on-chip) device and its associated firmware, and furthermore to inhibit unauthorized access to secrets, such as keys, operating modes, etc. The SOC security framework described herein defines hardware (HW), software (SW), or a combination thereof (i.e., firmware) to achieve these objectives.

Figure 2:
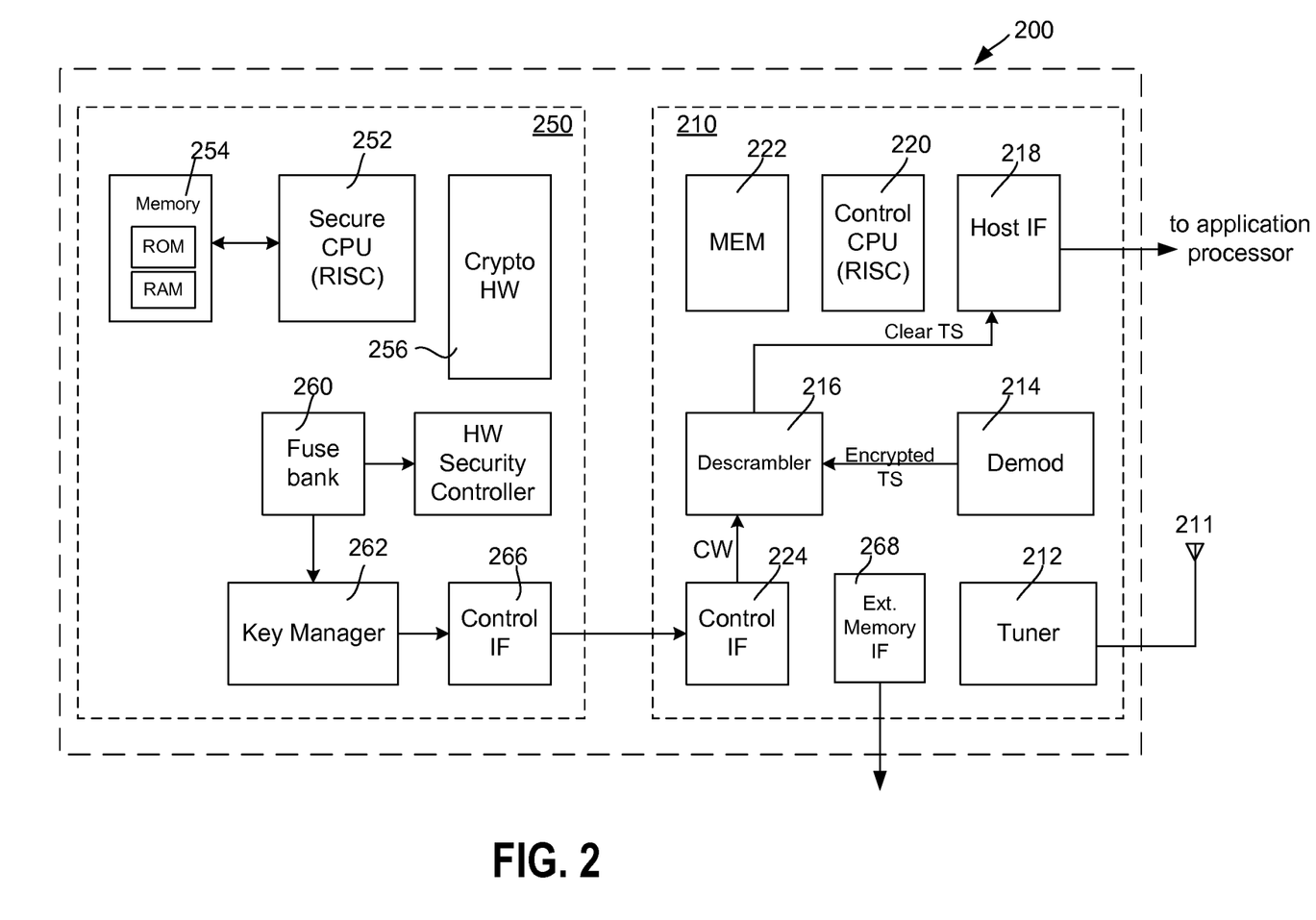
FIG. 2 is a simplified block diagram of a receiver system on a chip (SOC) according to an embodiment of the present invention.

FIG. 2 is a simplified block diagram of a receiver system on a chip (SOC) 200 configured to perform tuning, demodulating, CA security, and the like, in accordance with an embodiment of the present invention. Receiver system 200 includes a digital broadcast receiver 210 that may be capable of receiving signals in a number of different frequency bands of interest and/or in a number of different formats. By way of example, receiver system 200 may be capable of receiving any one or more of the standards mentioned above or other suitable standards. In an exemplary embodiment, receiver system 300 also includes a conditional access security (CAS) sub-system 250.

Digital broadcast receiver 210 includes a tuner 212 that is connected to an antenna 211. Although an antenna is shown, tuner 212 may be connected to a number of antennas that is configured to suit different frequency bands of interest. The tuner frequency translates received signals and provide them to a demodulator 214, which may demodulate the frequency translated signals into multiple data streams (audio, video, text, and others). Receiver 210 also includes a descrambler 216 that descrambles the data streams (indicated as encrypted TS) and provides clear (i.e., descrambled) data streams (indicated as clear TS in FIG. 2) to a host via a host interface unit 218. Receiver 210 further includes a control processor 220 and a memory unit 222 that contains software (program code) to enable a user to select a service and to program the tuner to a desired frequency. In an embodiment, memory 222 may include dynamic random memory and/or permanent memory such as read-only memory (ROM).

Receiver 210 also includes a control interface unit 224 that connects the broadcast receiver 210 with the conditional access security sub-system 250. As described in section above, control access is a protection of content required by content owners or service providers. Conventional access approaches use dedicated surface mount devices such as Smartcard, SIM card, secure SD card or the like. In conventional approaches, CA instruction code and keys provisioned by CA providers adapted to ensure security are typically stored in a non-volatile memory, such as an EEPROM or Flash, which are relatively expensive and cannot be easily and cost effectively integrated using standard CMOS fabrication processes. A novel conditional access security (CAS) sub-system according to an embodiment of the present invention will be described in detail below.

Referring to FIG. 2, CAS sub-system 250 includes a secure processor 252 coupled to a memory unit 254. The secure CPU may be a RISC CPU configured to process various processing operations. CAS sub-system 250 may further include a crypto hardware 256 that, in an embodiment, includes suitable crypto logic, circuitry (e.g., hardware) for performing cryptographic operations. In a specific embodiment, crypto hardware 256 may be a crypto processor configure to perform cryptographic functions such as processing digital signature, key management, identifying public keys and others due to the secure access requirements. During the manufacturing process, cryptographic hardware may generate a unique crypto ID (device identifier) for the receiver SOC 200 and a unique encryption key. CAS sub-system also includes a fuse bank 260. In an embodiment, fuse bank 260 may include electrically programmable fuses on the chip. In an embodiment, the fuse bank may contain an array of electrically programmable registers, each having a number of bits. The bits can be programmed during the manufacturing process or later by the service provider as the device is shipped to the user. In an embodiment, corresponding bits of the fuse bank are burned or blown according to the value of the unique device ID and a certificate key. In a specific embodiment, memory unit 254 may include random access memory and read-only memory. In contrast to conventional techniques, memory unit 254 does not includes EEPROM and/or Flash memory to facilitate the integration process and to minimize cost by using conventional (i.e., standard) CMOS process.

In an embodiment, receiver SOC 200 includes an external memory interface 268 configured to interface with an external memory device (not shown). The external memory may be a flash memory containing firmware or software code and other associated information data that are required for the receiver SOC to perform the descrambling functions. Details of the firmware, software code and the associated information data will be described in detail in sections below. In an embodiment, the external memory interface 268 can include a SD memory card slot, a multimedia card (MMC), a micro SD card slot, a mini SDHC, a microSDHC, a Memory Stick slot, a PCMCIA interface, a USB interface, a serial or a parallel interface, and others. The external memory can be a commercial off-the-shelf Flash memory in a specific embodiment.

In accordance with embodiments of the present invention, the conditional access (CA) software code is stored in a random access memory (RAM). The CA software is dynamically downloaded from an external non-volatile flash memory via the external memory interface 268 to the RAM during the power cycle of the security sub-system. However, because the external flash storing the CA software is outside the security perimeter it must first be authenticated and checked for any malicious alteration (such as bypass of the security function that could be inserted by a hacker). The secure sub-system implements a protocol to authenticate the firmware using a public key algorithm and digital certificate provisioned during manufacturing.

Figure 3:
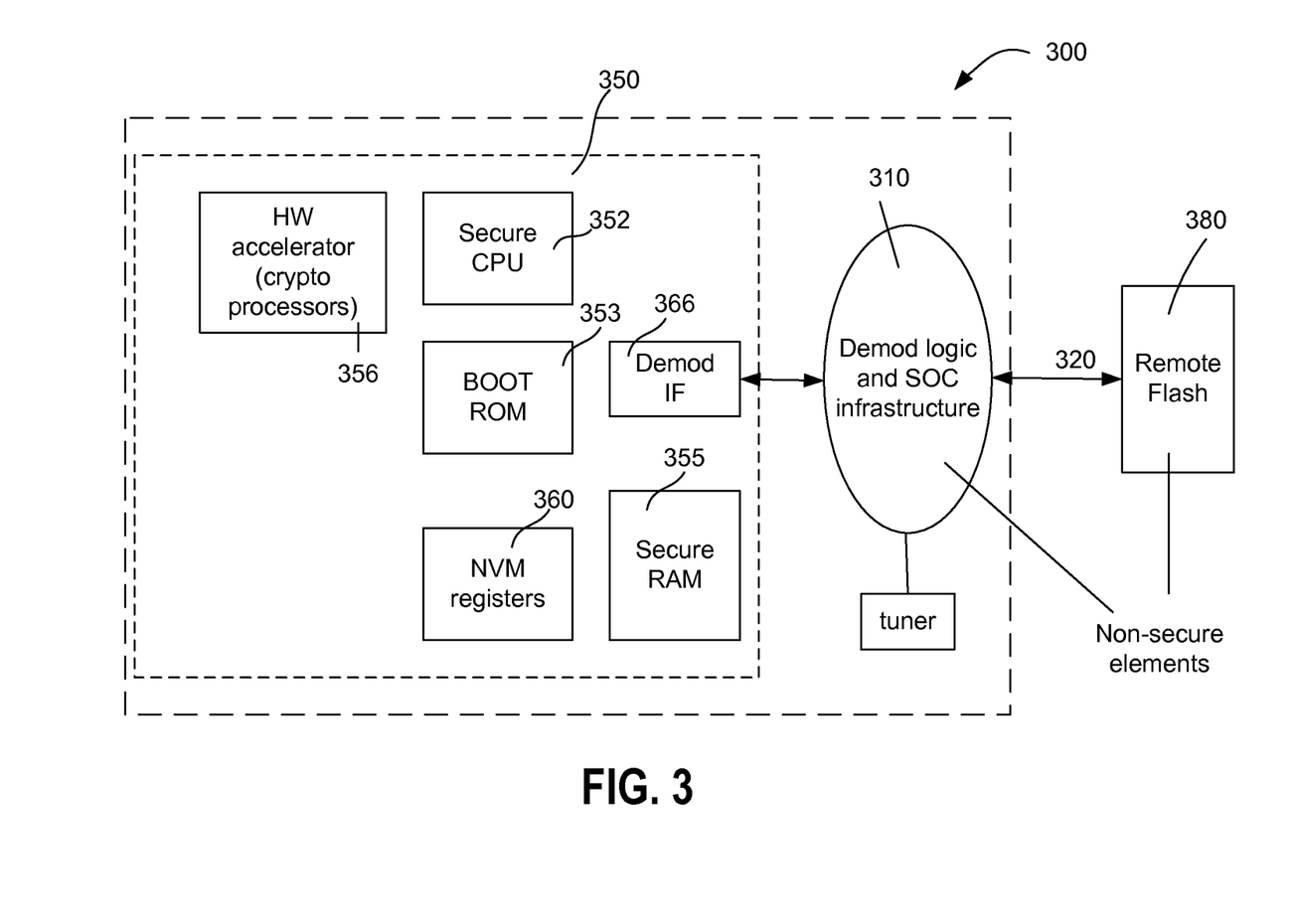
FIG. 3 is a simplified block diagram of a demodulator SOC having an integrated secure element according to an embodiment of the present invention.

FIG. 3 is a block diagram of a demodulator SOC 300 including a demodulation logic 310 coupled to a remote memory device 480 (e.g., Flash memory) and an integrated secure element 350 according to an embodiment of the present invention. Demodulation logic 310 may have a similar configuration of the receiver 210 shown in FIG. 2. For example, demodulation logic 310 may include a demodulator, a descrambler, a control CPU, a memory unit that comprises RAM and/or ROM, a host interface, and a control interface unit; the functions of those elements have been described in details in the sections above and won't be repeated herein for brevity. The demodulator logic 310 may further include system-on-a chip infrastructure such as registers, IO ports, an external memory interface link 320, which may be similar to the external memory interface port 268 shown in FIG. 2 and described above. In an embodiment, remote or external Flash memory 380 may be coupled to the demodulator SOC 300 through the interface link 320. The coupling can be by means of a physical connection such as a SD card connector or a USB connector. In another embodiment, the coupling can be by means of an optical (e.g., infrared) or radio wave (e.g., Bluetooth, wireless LAN IEEE802.11, or the like) communication link.

In an embodiment, integrated secure element 350 includes a secure CPU 352, a boot read-only memory (ROM) 353, a secure random access memory (RAM) 355, multiple non-volatile memory registers (or one-time programmable fuse banks) 360. CPU 352 may include an adder and logic for executing arithmetic operations or comparative decisions. In an embodiment, the non-volatile memory registers are implemented using fuse cells that can be fabricated using standard CMOS processes. In an embodiment, the non-volatile memory registers are programmed (burned or blown) during the silicon manufacturing process to store information such as the device ID, the root public key, and others. Integrated secure element 350 also includes a hardware accelerator 356 that can be one or more crypto processors as described above in association with crypto hardware 256 of FIG. 2.

In order to minimize cost, the CA software code is stored in the secure RAM 355 according to an embodiment of the present invention. CA software is understood as instructions, one or more sets of instructions, data files, firmware, or executable applications that are provided to the secure CPU 352 for execution. CA software is dynamically downloaded from the remote (external) flash memory 380 to the RAM 355 ("RAM-ware") during the power cycle of the integrated secure element 350. Because CA software is downloaded from the external Flash memory, it must be first authenticated by the integrated secure element 350. In an embodiment, the secure element operates a protocol to authenticate the RAM-ware using a public key algorithm and a digital certificate (e.g., a unique device ID) that is provided during the manufacturing of the demodulator SOC. In an embodiment, the authentication process can be assisted and accelerated using hardware accelerator 356.

In an embodiment, CA software is received by the demodulator logic from the external memory and transferred to the secure RAM 355 via a demodulator interface circuit 366. In contrast to conventional secure elements that store the CA software code in EEPROM and/or Flash memory, embodiments of the present invention provides a RAM-ware architecture that can be updated securely and easily, e.g., by downloading firmware (i.e., software, program codes, data files) stored in external memories. Because the external memory containing the CA software is outside the security perimeter of the secure element, it must first be authenticated. In an embodiment, the downloaded CA software is authenticated by the secure element running boot authenticate programs from the boot ROM 353. Because the RAM-ware architecture does not require EEPROM and/or Flash memory that requires among other things a double poly process or a tunnel oxide process and expensive testing equipment and procedures, the RAM-based architecture of the present invention can be cost effectively produced using standard CMOS processes.

In an embodiment, the integrated secure element produces an attribute based on a digital certificate contained in the received software (now RAM-ware because it is now stored in the secure RAM) and provides the attribute to the demodulator logic for descrambling the received data streams (not shown). In some embodiments, the attribute can be a secure bit pattern or a secure codeword to enable the descrambling process in the demodulator logic 310.

In an embodiment, the integrated secure element 350 is activated when the TV application is enabled by the user. When the TV application is enabled, the demodulator logic causes the boot ROM to execute the boot instructions and activate the integrated secure element. During the boot process, the conditional access (CA) firmware stored in the external flash memory is downloaded to the RAM disposed in the secure element, so that the CPU starts operating.

As described above, the remote Flash memory contains conditional access (CA) executable applications or data files that are dynamically loaded to the RAM 355 disposed in the integrated secure element. In an embodiment, the external memory contains a digital certificate that is generated by the CA vendor or the demodulator SOC device manufacturer and signed with the root private key or a derivative of the root key using public key infrastructure (PKI). In an embodiment, the digital certificate may be unique to each demodulator SOC device and contains a device identification (ID) code. In an embodiment, the same identification code may also be stored in one or more of the non-volatile registers 460. In an embodiment, the non-volatile memory registers 360 may also store a digital signature of the CA software or CA firmware. In an embodiment, the boot ROM authenticates the CA firmware by means of the digital certificate.

In an embodiment, the secure boot ROM may process the digital certificate as follows: (i) verify that the certificate is authentic and the certificate has been signed by a trusted delegate of the root key owner; (ii) verify that the certificate is intended for the given device by comparing the device ID stored in the secure element NVM (non-volatile memory) registers and the code stored in the certificate to ensure that they match; and (iii) authenticate the firmware by regenerating its signature with the root public key and comparing the result with the value stored in the certificate. Only when the above three steps are successful, the SW that has been downloaded to the secure element RAM is verified and considered to be trustworthy. In an embodiment, the SW code in the external memory may be encrypted. In this case, it is first deciphered by the boot ROM. The SW encryption key (or a derivative) is stored in the secure element NVM registers and used directly by the ROM code.

Figure 4:
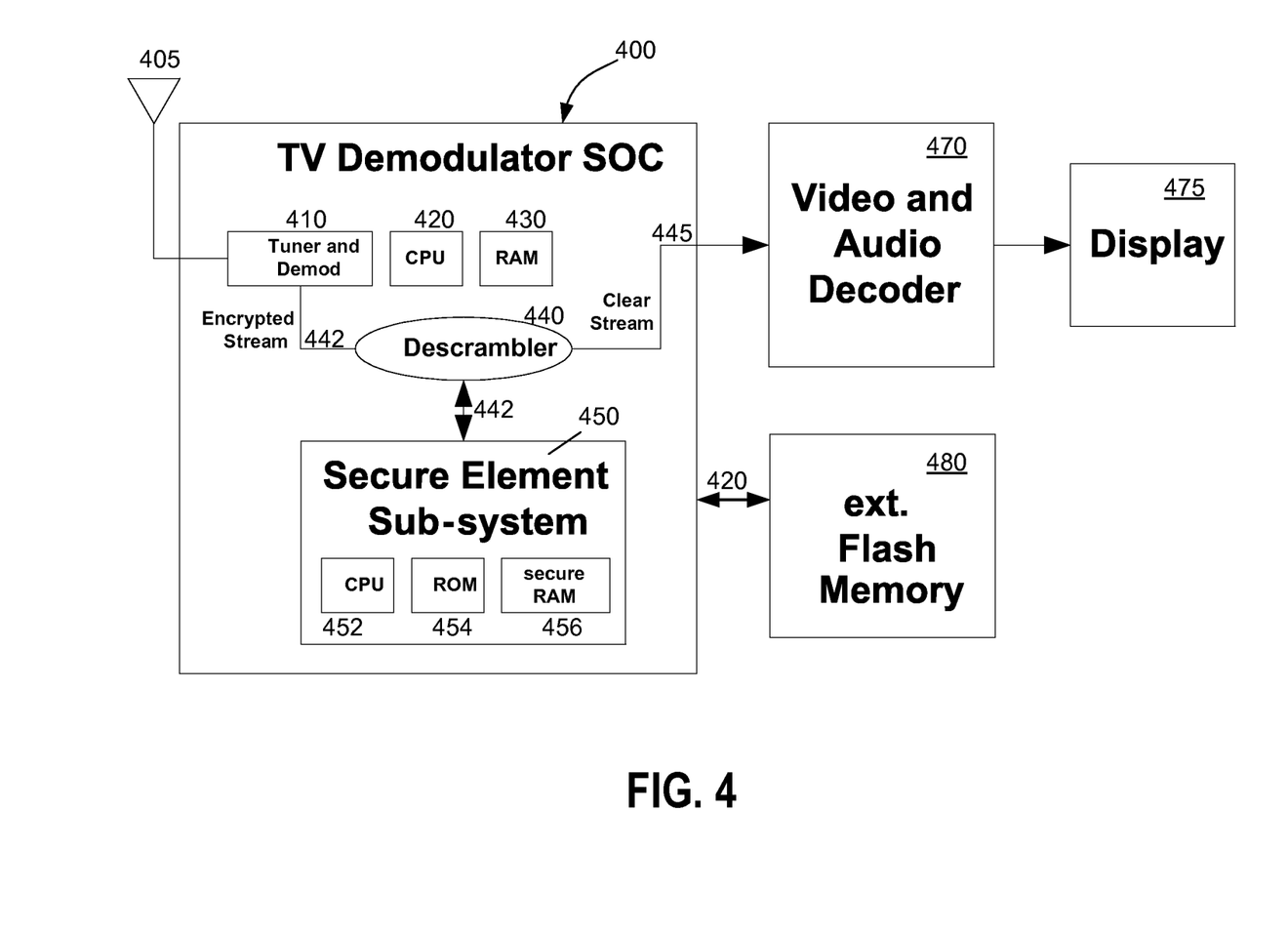
FIG. 4 is a block diagram of a TV demodulator SOC in communication with an external video and audio decoder and an external flash memory according to an embodiment of the present invention.

FIG. 4 is a block diagram of a TV demodulator SOC 400 in communication with an external video and audio decoder 470 and a flash memory 480 according to an embodiment of the present invention. As shown, the TV demodulator SOC includes a tuner and demodulator 410 coupled to an antenna 405 for received a desired modulated content that may be encrypted. TV demodulator SOC 400 may include a demodulator CPU 420 for communicating with a user and for controlling the tuner demodulator. Demodulator CPU 420 is coupled to a memory unit 430 that may contain static random access memory and read-only memory. TV demodulator SOC 400 also includes a descrambler 440 that is configured to received an encrypted data stream 412 from the tuner and demodulator 410 using an encryption key or a control word delivered from a secure element sub-system. In contrast to a conventional conditional access system, the secure element sub-system is integrated within the TV demodulator SOC. The secure element sub-system includes a secure CPU 452 coupled to a read-only memory ROM 456 and a secure random access memory RAM 456. In contrast to the conventional access system that contains flash memory or EEPROM for storing boot loader firmware, TV demodulator SOC does not include flash memory or EEPROM, so that TV demodulator SOC can be fabricated using cost effective standard CMOS processes that do not require special floating gate processes and associated testing steps.

TV demodulator SOC receives a firmware image (i.e., data representative or a copy of the firmware disposed in an external device. The term firmware and firmware image will be used alternatively hereinafter) from external flash memory 480 via a memory interface port 420. The firmware download can be, for example, initiated by the demodulator CPU 420 and stored in the secure RAM 456. Because the flash memory is external to the TV demodulator SOC and thus to the secure element sub-system, the firmware image (i.e., a copy of the firmware) must be first authenticated by the secure element sub-system before being executed. Upon a successful authentication, the secure element sub-system will execute the firmware image to produce a control word or encryption key for the descrambler to decipher the encrypted data stream. The control word is transmitted to the descrambler through a physical link 442 that must be protected from hacking Details of the firmware download from the external flash memory, the authentication process and the protection of the control word through obfuscation will be described in more detail below.

The descrambler deciphers the encrypted data stream and produces a clear data stream to a video and audio decoder 470 that is coupled to a display unit 475 for reproducing the video and audio content.

Figure 5:
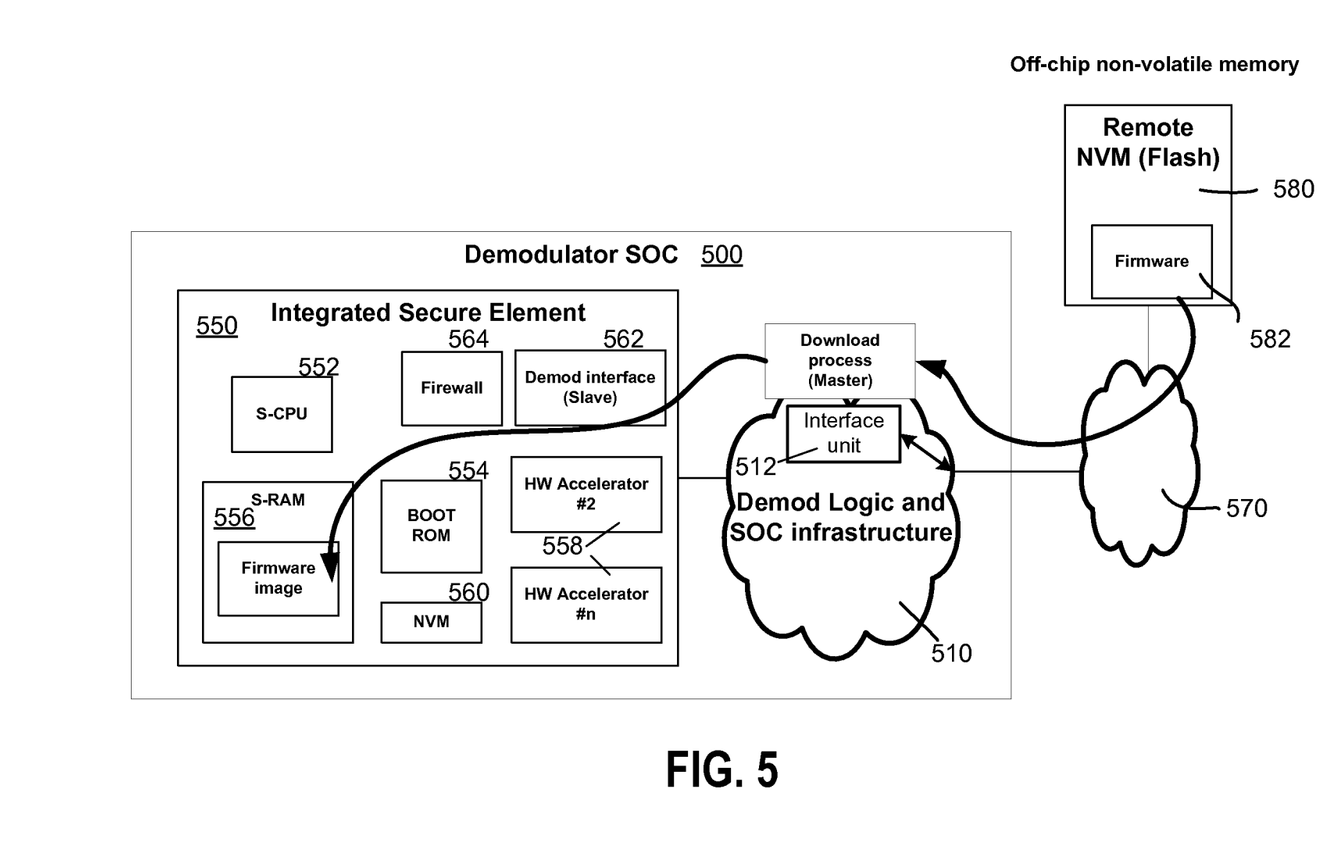
FIG. 5 illustrates a demodulator SOC performing a firmware download operation from an external memory according to an embodiment of the present invention.

FIG. 5 illustrates a demodulator SOC 500 performing a firmware download operation from an external memory according to an embodiment of the present invention. Demodulator SOC 500 comprises a demodulator logic 510 and an integrated secure element 550. Demodulator logic 510 may include a tuner, a demodulator, a descrambler, control CPU, a memory unit, a host interface as shown in FIG. 2. The demodulator logic may include SOC infrastructure having one or more IO ports, a memory interface unit, and others. In an exemplary embodiment, the SOC infrastructure may include an interface unit 512 such as a USB, a peripheral computer interface (PCI), a SD (secure digital) interface, or a communication link for interfacing with an off-chip non-volatile memory 580. In a specific embodiment, interface unit 512 may establish a connection to the remote memory via a short distance physical connection by means of a USB connector, an SD connector, or the like. In another embodiment, the interface unit 512 may coupled to the remote NVM memory 580 via a local area network, a personal area network (Bluetooth) or a wireless area network according to the IEEE802.11 standard or the like (the local, personal, or wireless area network is indicated as a cloud 570).

The integrated secure element includes a secure CPU 552 that together with a boot ROM 554 initiates the integrated secure element at power up. The secure element further includes a secure random access memory (S-RAM) 556, one or more hardware accelerators 558, one or more non-volatile memory (NVM) registers or fuses 560, and a slave demodulator interface circuit 562 that couples the integrated secure element 550 with the demodulator logic 510.

The secure element may include a firewall 564 that allows for the secure CPU to initiate a connection to the remote memory 580 and download firmware (i.e., data files, executable applications) 582 from the remote memory to the secure S-RAM 556, but does not allows the remote memory to initiate a connection in the reverse direction.

After clearing the content of secure S-RAM 556, the demodulator SOC may initiate a download of firmware 582 from remote flash device 580. The download process can be performed by the demodulator CPU D-CPU by means of the hardware master port and send the firmware to the secure S-RAM through slave port interface 562. However, this read-and-write of the CA firmware from the remote flash memory cannot be considered as secure because demodulator logic 510 and remote flash memory 580 are outside of the secure element boundary. Therefore, the downloaded firmware image in the secure S-RAM must be authenticated to protect the firmware image from modification. Once the firmware image download is complete, the secure element locks the slave interface and the firewall to prevent any subsequent access from the non-trusted demodulator interface and secure S-CPU 552 may start executing from boot ROM 554. It is noted that the demodulator logic cannot access secure element 550 through master-slave demodulator interface 562 once the security element is locked.

Figure 6:
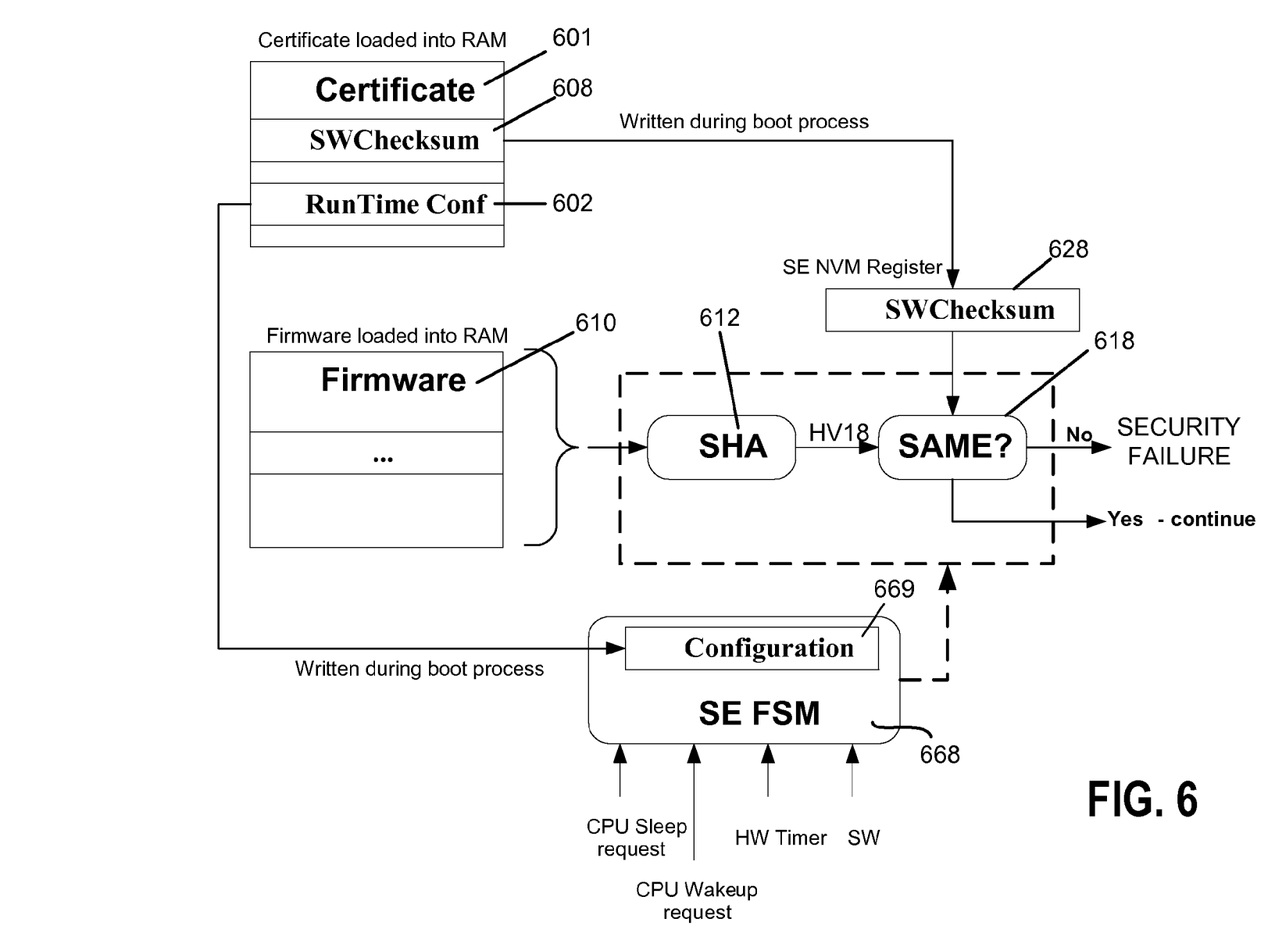
FIG. 6 is a diagram illustrating an exemplary firmware run-time authentication using hardware facilities provided by the secure element according to an embodiment of the present invention.

FIG. 6 is a diagram illustrating a firmware run-time authentication 600 using hardware facilities provided by the secure element according to an exemplary embodiment of the present invention. Firmware run-time authentication 600 is an exemplary embodiment providing an efficient way to mitigate the risk of running malicious code at run time. The firmware run-time authentication verifies and authenticates software within power cycles to protect hardware intrusive attacks and fault injection. In an embodiment, the hardware facilities of the secure element writes (programs by burning or blowing fuses) a software checksum SWChecksum 608 to one or more of the NVM registers 628 during the boot process and writes runtime configuration parameter to corresponding configuration registers of the secure element finite state machine 668, which controls the cryptographic hash function 612 and the comparator 618. Cryptographic hash function 612 produces a hash value HV18 from firmware 610 and compares (618) the hash value HV18 with the SWChecksum stored in one of the NVM registers 628. In the event that there is a match (indicated as "Yes"), the secure element continues its operation. In the event there is no match (indicated as "No"), i.e., the firmware may have been modified or compromised, the secure element disables the firmware execution. In some embodiments, the firmware run-time authentication can be triggered from different sources that may include, but is not limited to: 1) software driven by requesting an authentication through a control register in the security element; 2) hardware timer as a recurring event driven by a hardware counter set during the boot process; 3) when the secure S-CPU enters or exits a sleep period; or 4) when the secure S-CPU receives a wakeup request.

In an embodiment, the hash value of the decrypted firmware is stored in the boot certificate and is programmed into one of the NVM (one-time-programmable) registers in the secure element during the boot process so that it cannot be modified or altered. It is important to note that this process cannot be performed by the RAM-ware itself because the RAM-ware can be tampered with. Thus, the process has to be performed entirely in hardware or using code stored in ROM that cannot be modified. The SWchechsum written into a write-once memory register can be reset on power-on/off of the secure element. In addition, the secure element includes control parameters that define the source and recurrence of the run-time check.

In an embodiment, certificate 601 may include runtime configuration data 602 that is written into associated configuration registers 669 of the secure element. Configuration data 602 may configure or customize the finite state machine (FSM) so that the secure element operates in a manner that is desired by a vendor or a service provider. In this example embodiment, the secure element may start executing the firmware in the secure RAM upon a successful authentication. The execution of the firmware may include generating a control word and provide it securely to the demodulator for deciphering encrypted data streams.

Embodiments of the present invention include a secure generation and distribution of a pair of encryption keys by a secured server. A first encryption key may be sent to a first recipient that uses the first encryption key to encipher (encrypt) a data file before distributing it to a target subscriber. The second encryption key is sent to a second recipient that may program the encryption key into a secure element during the manufacturing process. The secure element will use the stored key to decipher (decrypt) the encrypted data file received from the first recipient. The pair of encryption keys may be unique to the secure element. That is, each target subscriber may receive a secure element having a unique private key for deciphering the encrypted data file.

Figure 7:
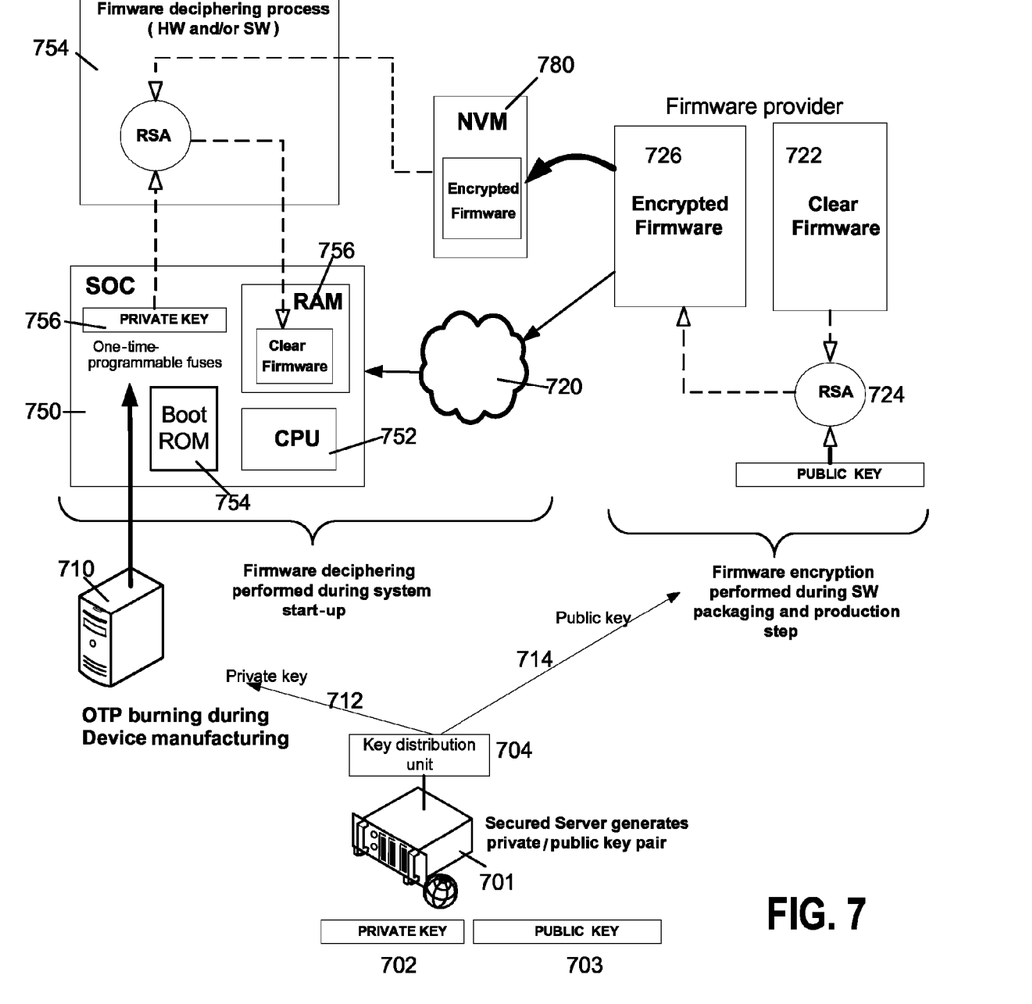
FIG. 7 a block diagram illustrating a secure generation and distribution of asymmetric keys according to an embodiment of the present invention.

FIG. 7 a block diagram illustrating a system and method for securely generating and distributing a pair of asymmetric keys according to an embodiment of the present invention. In an embodiment, the secure key distribution system includes a secured server 701 for generating and storing a pair of keys including a private key 702 and a public key 703. A key distribution unit 704 is coupled to secured server 701 and provides the private key to an original design manufacturer (ODM), an original equipment manufacturer (OEM), or a device manufacturer 710 and the public key to a firmware provider. The key distribution system in reference to FIG. 7 may be used by a service provider or a content provider that teams up with a device manufacturer, an ODM or an OEM to provide secure devices to target subscribers for accessing broadcast services and contents. The service provider also may team up with a conditional access (CA) firmware provider for creating firmware for the operation of the secure devices. In an embodiment, the service or content provider may operate the secured server 701 that is communicatively connected to the device manufacturer through a key distribution unit 704. In an embodiment, the communication between the device manufacturer and the key distribution unit is via a secure communication link 712. In an embodiment, the device manufacturer may send a request to the secured server for obtaining a private key. In reply to the request, the secured server may send the private key to the device manufacturer via the secure communication link 712. In an embodiment, the secure communication link 712 may be a secure sockets layer (SSL) link. In an embodiment, the key distribution unit 704 may perform functions associated with conventional communication systems such as authentication the request by the user identity and the password and the like and management of the communication traffic between the secured server and the requester. In another embodiment, the device manufacturer may operate the secured server to generate the private and public keys and provides the public key to the CA firmware provider via the key distribution unit.

In an embodiment, firmware provider receives the public key sent by the key distribution unit and encrypts (724) a clear firmware 720 using the received public key to produce an encrypted firmware 726. In an embodiment, the clear firmware 720 may includes a conditional access firmware for distributing to target subscribers. In an embodiment, the clear firmware 722 can be encrypted using the RSA algorithm. In an embodiment, the encrypted firmware 726 can be stored in a non-volatile memory device 780 for sending to target subscribers.

Still referring to FIG. 7, device manufacturer (ODM, OEM) 710 may produce a receiver system on a chip (SOC) as shown and described in FIG. 2, a demodulator SOC as shown and described in FIG. 3, or a demodulator shown an described in FIGS. 4 and 5. For the sake of brevity, only parts of the SOC that are used for the decryption of the encrypted firmware will be described below. SOC 750 may includes a secure CPU 752 that is coupled to a boot ROM 754 and a secure random access memory (RAM) 756. SOC 750 also includes a non-volatile register which can be an one-time programmable array of fuses or a secure flash register for storing the received private key. It is noted that the programmed private key in the non-volatile register or the one-time programmable array of fuses is not accessible externally once programmed. Other precautions can be taken to hide or obfuscate the stored private key.

SOC 750 may include a decryption module 754 that can be a crypto-processor, hardware logic, or a dedicated deciphering hardware and software to decrypt the encrypted firmware 726 contained in the remote non-volatile memory 780. In an embodiment, the deciphering process (decryption module 754) decrypts the encrypted firmware using the RSA algorithm. The clear (i.e., decrypted) firmware is then stored in secure RAM 756. In an embodiment, the clear firmware is authenticated prior to being stored in the secure RAM or executed by CPU 752.

In an embodiment, SOC may download the encrypted firmware 726 via a communication network 720 that is disposed between the firmware provider and the SOC 750. Communication network can be one of the local area network, a metropolitan area network, a wide area network, or a wireless or cellular network.

Figure 8:
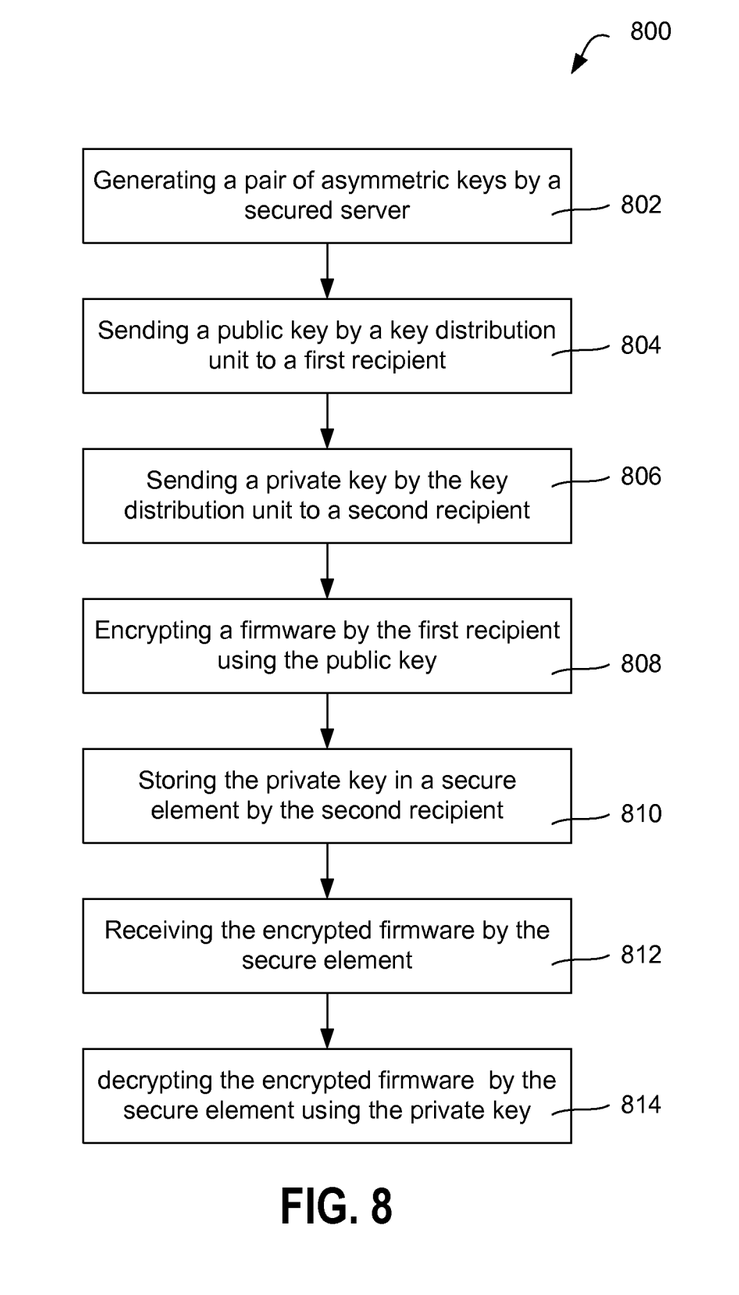
FIG. 8 is a flowchart diagram illustrating an example method of generating a pair of asymmetric keys and securely providing the keys to authorized recipients according to an embodiment of the present invention.

FIG. 8 is a flow diagram of an example method 800 of generating a pair of asymmetric keys and securely providing the keys to authorized recipients according to an embodiment of the present invention. This flow diagram is merely an example, which should not unduly limit the scope of the claims herein. One of ordinary skill in the art would recognize other variations, modifications, and alternatives. For example, one or more steps can be provided in a different sequence without departing from the scope of the claims herein. In step 802, a secured server generates a pair of asymmetric keys including a public key and a private key that are then provided to authorized recipients. It is appreciated that the public and private keys are unique for the authorized recipients and thus provide a robust binding mechanism between the authorized recipients. In step 804, a key distribution unit that is communicatively connected to the secured server sends the public key to a first recipient via a first communication link. In an embodiment, the first recipient may be a conditional access firmware vendor that uses the received public key to encrypt a firmware (step 808) prior to distributing it to target subscribers. In an embodiment, the encrypted firmware may be stored in a non-volatile memory device such as a CD-ROM or a flash memory device for distribution. In another embodiment, the first recipient may make the encrypted firmware accessible or downloadable via the Internet. In step 806, the key distribution unit sends the private key to a second recipient via a second communication link. The second recipient can be a device manufacturer, an ODM, or OEM that programs the received private key into a non-volatile register that can be an one-time programmable array of fuses or a secure flash register in a secure element of a system-on-a-chip demodulator or receiver. At step 810, the second recipient programs the received private key in a secure element of the SOC demodulator or receiver. The programming may be performed by burning or blowing a number of fuses during the manufacturing process of the secure element in a preferred embodiment. At step 812, the secure element may download the encrypted firmware either from a remote non-volatile memory device or via the Internet from the first recipient. In step 814, the secure element deciphers the encrypted firmware using the private key contained in its one-time programmable fuse array.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An encryption key distribution system comprising:
    a secured server configured to generate at least one pair of keys including a first key and a second key;
    a key distribution unit operably coupled to the secured server;
    a first recipient configured to receive the first key through the key distribution unit and encrypt a data file using the first key; and
    a second recipient configured to receive the second key through the key distribution unit and program a secure element;
    wherein the secure element comprises:
        at least one non-volatile register configured to store the second key;
        a random access memory configured to store an image of the encrypted data file;
        a read-only memory including a boot code; and
        a processing unit coupled to the read-only memory and the random access memory and being operative to decrypt the image of the encrypted data file using the second key.

2. The encryption key distribution system of claim 1, wherein the first key and the second key are different.

3. The encryption key distribution system of claim 1, wherein the first recipient is a conditional access software provider and the second recipient is a original design manufacturer (ODM) or a original equipment manufacturer (OEM).

4. The encryption key distribution system of claim 1, wherein the second recipient is connected to the key distribution unit via a secure communication link.

5. The encryption key distribution system of claim 4, wherein the secure communication link is a secure sockets layer (SSL) link.

6. The encryption key distribution system of claim 1, wherein the second key is programmed into the at least one non-volatile register during a manufacturing process of the secure element.

7. The encryption key distribution system of claim 1, wherein the secured server is operated by a service provider.

8. The encryption key distribution system of claim 1, wherein the secure element receives the encrypted data file from the first recipient via the Internet.

9. The encryption key distribution system of claim 1, wherein the secure element receives the encrypted data file through an external non-volatile memory device.

10. An encryption key distribution method comprising:
    generating, by a secured server, at least one pair of keys including a first key and a second key;

providing, by a key distribution unit, the first key to a first recipient, encrypting a data file by the first recipient using the first key;

providing, by the key distribution unit, the second key to a second recipient; and programming, by the second recipient, the second key in a secure element;

wherein the secure element comprising:

a non-volatile register configured to store the second key;

a random access memory configured to store an image of the encrypted data file;

a read-only memory including a boot code; and a processing unit coupled to the read-only memory and the random access memory and being operative to decrypt the image of the encrypted data file.

11. The encryption key distribution method of claim 10, wherein the first key and the second key are different.

12. The encryption key distribution method of claim 10, wherein the first recipient is a conditional access software provider and the second recipient is a original design manufacturer (ODM) or a original equipment manufacturer (OEM).

13. The encryption key distribution method of claim 10, wherein the second recipient is connected to the key distribution unit via a secure communication link.

14. The encryption key distribution method of claim 13, wherein the secure communication link is a secure sockets layer (SSL) link.

15. The encryption key distribution method of claim 10, wherein the second key is programmed into the non-volatile register during a manufacturing process of the secure element.

16. The encryption key distribution method of claim 10, wherein the non-volatile register is an one-time programmable register comprises a plurality of fuses.

17. The encryption key distribution method of claim 10, wherein the secured server is operated by a service provider.

18. The encryption key distribution method of claim 10 further comprising sending the encrypted data file, by the first recipient, to the secure element via an external non-volatile memory device.

* * * * *